United States Patent
Hsu et al.

(10) Patent No.: US 9,075,602 B2
(45) Date of Patent: Jul. 7, 2015

(54) METHOD AND DEVICE OF POWER SAVING FOR TRANSMITTING SIGNALS

(75) Inventors: Chia-Hua Hsu, Hsinchu (TW); Kuang-Fu Cheng, Hsinchu (TW); Pei-Si Wu, Kaohsiung (TW)

(73) Assignee: REALTEK SEMICONDUCTOR CORP. (TW)

( * ) Notice: Subject to any disclaimer, the term of this patent is extended or adjusted under 35 U.S.C. 154(b) by 619 days.

(21) Appl. No.: 13/117,632

(22) Filed: May 27, 2011

(65) Prior Publication Data

US 2011/0302434 A1   Dec. 8, 2011

(30) Foreign Application Priority Data

Jun. 2, 2010   (TW) ................................ 99117841 A

(51) Int. Cl.
  *G06F 13/42*   (2006.01)
  *G06F 1/00*   (2006.01)
  *G06F 1/26*   (2006.01)
  *G06F 1/32*   (2006.01)

(52) U.S. Cl.
  CPC ............... *G06F 1/32* (2013.01); *G06F 1/3253* (2013.01); *G06F 2213/0038* (2013.01); *Y02B 60/1235* (2013.01)

(58) Field of Classification Search
  CPC ....... G06F 1/32; G06F 1/3206; G06F 1/3234; G06F 1/3296; G06F 13/42; G06F 13/4265
  USPC .................................. 710/106; 713/300, 320
  See application file for complete search history.

(56) References Cited

U.S. PATENT DOCUMENTS

| | | | |
|---|---|---|---|
| 6,243,817 B1 * | 6/2001 | Melo et al. .................. | 713/300 |
| 6,990,542 B2 * | 1/2006 | Nguyen ....................... | 710/260 |
| 7,536,473 B2 * | 5/2009 | Ajanovic et al. ............. | 709/234 |
| 2001/0023189 A1 * | 9/2001 | Kajimura ..................... | 455/522 |
| 2003/0103483 A1 * | 6/2003 | Joshi et al. .................. | 370/338 |
| 2004/0008684 A1 * | 1/2004 | Garney et al. ............. | 370/395.4 |
| 2004/0165607 A1 * | 8/2004 | Carnevale et al. ........... | 370/412 |
| 2004/0184409 A1 * | 9/2004 | Schoenborn et al. ......... | 370/249 |
| 2004/0221216 A1 * | 11/2004 | Nack ............................ | 714/745 |
| 2004/0236802 A1 * | 11/2004 | Baratakke et al. ............ | 707/204 |

(Continued)

FOREIGN PATENT DOCUMENTS

| CN | 103095420 A | * | 5/2013 | ............... H04L 1/06 |
|---|---|---|---|---|
| CN | 102347880 B | * | 9/2014 | ............. H04L 12/40 |

(Continued)

OTHER PUBLICATIONS

Chinese Office Action, Patent Application No. CN 100098, Jun. 28, 2013, 9 pp.

*Primary Examiner* — Faisal M Zaman
(74) *Attorney, Agent, or Firm* — Volpe and Koenig, P.C.

(57) ABSTRACT

A method and device of the power saving for transmitting a signal is provided. The method comprises the steps of: transmitting a test signal with a first test amplitude from a local terminal, wherein the first test amplitude is selected from a plurality of preset amplitudes; acknowledging that the test signal with the first test amplitude has been received by a remote terminal if an acknowledgement signal is transmitted from the remote terminal for a response to the test signal; and transmitting a data signal having a data amplitude based on the first test amplitude. The device can transmit the data signal with a small data signal amplitude by the method to achieve the saving power.

18 Claims, 5 Drawing Sheets

(56) References Cited

U.S. PATENT DOCUMENTS

| | | |
|---|---|---|
| 2005/0261018 A1 | 11/2005 | Yamamoto |
| 2006/0233279 A1* | 10/2006 | Ryder et al. .................. 375/296 |
| 2007/0230509 A1* | 10/2007 | To et al. ........................ 370/503 |
| 2008/0063126 A1* | 3/2008 | Ong et al. ...................... 375/358 |
| 2008/0178011 A1* | 7/2008 | Hubo et al. ................... 713/300 |
| 2009/0279473 A1* | 11/2009 | Lu et al. ........................ 370/315 |
| 2010/0002758 A1* | 1/2010 | Martwick ...................... 375/227 |
| 2010/0284352 A1* | 11/2010 | Lee et al. ...................... 370/329 |
| 2011/0206018 A1* | 8/2011 | Li et al. ......................... 370/336 |
| 2012/0017016 A1* | 1/2012 | Ma et al. ....................... 710/110 |
| 2012/0079162 A1* | 3/2012 | Jaramillo ...................... 710/316 |
| 2012/0085169 A1* | 4/2012 | Walmsley ................... 73/514.32 |

FOREIGN PATENT DOCUMENTS

| | | | | |
|---|---|---|---|---|
| GB | 2514886 A | * | 12/2014 | .............. G06F 11/07 |
| JP | 2011040965 A | * | 2/2011 | .............. H04L 29/08 |
| JP | 5125430 B2 | * | 1/2013 | .............. G06F 13/38 |

* cited by examiner

METHOD AND DEVICE OF POWER SAVING FOR TRANSMITTING SIGNALS

The application claims the benefit of Taiwan Patent Application No. 099117841, filed on Jun. 2, 2010, in the Taiwan Intellectual Property Office, the disclosures of which are incorporated herein in their entirety by reference.

FIELD OF THE INVENTION

The invention relates to a method and device for deciding the amplitude of the data signal, more particularly to the method and the device using a Peripheral Component Interconnect Express (PCI Express) for deciding the amplitude of the data signal.

BACKGROUND OF THE INVENTION

FIG. 1 schematically illustrates the signal voltage of PCI Express device in the prior art. Generally, the signal of PCI Express device is a kind of differential signals. A D+ signal (the solid sin wave in FIG. 1) and a D− signal (the dotted sin wave in FIG. 1) are generated by a differential voltage driver. The potential difference between the D+ signal and the D− signal is the differential voltage. When the voltage of the D+ signal is higher than the voltage of the D− signal, there is a positive potential difference which is defined as the logic "1" state. When the voltage of the D+ signal is lower than the voltage of the D− signal, there is a negative potential difference which is defined as the logic "0" state. When the potential difference reaches maximum potential difference, it can be regarded as a differential peak voltage ($V_{DIFFp}$). The maximum difference between the positive potential difference and the negative potential difference is a differential peak-to-peak voltage ($V_{DIFFp-p}$) which is twice of the $V_{DIFFp}$. The $V_{DIFFp-p}$ is the signal amplitude between the logic "1" state and the logic "0" state.

Since different hosts require different signal amplitudes and the length of the transmitting line is different due to the different operating states, the transmitting amplitude of PCI Express device is prescribed to ensure that the transmitting amplitude is high enough to be received by the receiving terminal, wherein the $V_{DIFFp-p}$ generated by the output driver is prescribed within a range of 800 mV to 1200 mV and the $V_{DIFFp-p}$ which can be received by the receiving terminal is prescribed within a range of 175 mV to 1200 mV in the standard. According to the aforementioned standard, when the minimum $V_{DIFFp-p}$ (800 mV) is generated by the transmitting terminal, the maximum of the amplitude attenuation corresponding to the receivable $V_{DIFFp-p}$ of the receiving terminal is 625 mV. However, there would not be a large attenuation in most situations. Moreover, if the length of the transmitting line is ultra short, the high amplitude should be unnecessary since the data would still be received by the receiving terminal.

Various green movements are going to be carried out in the modern society. The reduction of the power consumption is one of the green movements. In PCI Express device, the high amplitude represents the large power consumption. Therefore, if the difference between the amplitude received by the receiving terminal and the minimum receivable amplitude thereof is large, the power waste is high. If the amplitude can be reduced and the stabilization of the data transmission can be maintained at the same time, the unnecessary power waste can be prevented. However, when the data amplitude is reduced, the stabilization of the data transmission can not be maintained if the minimum of the transmitting amplitudes which are large enough to be received by the receiving terminal can not be determined.

Therefore, to overcome the drawbacks from the prior art and to meet the present needs, the Applicant dedicated in considerable experimentation and research, and finally accomplished the "Method and Device of Power Saving for Transmitting Signals" of the present invention. Before the data signal is transmitted in PCI Express device, the first Training Sequence (TS1) which should be transmitted for determining whether the connection is completed is used for determining the minimum amplitude during the data signal transmitting to reduce the voltage to solve the problem that the power waste in prior art is too much. The present invention is briefly described as follows.

SUMMARY OF THE INVENTION

To solve the above drawbacks, the purpose of the present invention is provided a method and device for deciding the amplitude of the data signal, wherein the method determines the minimum amplitude which the transmitting terminal transmits to make the receiving terminal can receive.

According to the first aspect of the present invention, a power saving method for signal transmission is provided. The method includes steps of: transmitting a test signal from a local terminal, wherein the test signal has a first test amplitude selected from a plurality of preset amplitudes; acknowledging the first test amplitude of the test signal is received by a remote terminal if an acknowledgement signal transmitted from the remote terminal for a response to the test signal is received by the local terminal; and transmitting a data signal having a data signal amplitude based on the first test amplitude.

Preferably, the method further includes step of transmitting the test signal with a second test amplitude higher than the first test amplitude if the acknowledgement signal transmitted from the remote terminal is not received in a predetermined period.

Preferably, the first test amplitude is a minimum of the plurality of preset amplitudes, the plurality of preset amplitudes are stored in an amplitude table of a storage unit and the data signal amplitude is not less than the first test amplitude or is equal thereto.

Preferably, the method is used for wire transmission, a channel is configured between the local terminal and the remote terminal and an amplitude attenuation of the channel is substantially constant.

Preferably, the method is used for PCI Express and the method needs to be performed again if at least three Non-Acknowledgement (NAK) signals are consecutively transmitted from the remote terminal and received by the local terminal when the local terminal is transmitting the data signal.

According to the second aspect of the present invention, a data transmitting and receiving device communicating with a remote device is provided. The device includes a storage unit storing an amplitude table with a plurality of preset amplitudes; an amplitude control unit coupled with the storage unit and selecting a first amplitude from the plurality of preset amplitudes; and an output unit coupled with the amplitude control unit and transmitting an output signal based on the selection of the amplitude control unit so that the output signal substantially has the first amplitude.

Preferably, the data transmitting and receiving device further includes an input unit receiving an input signal; and a processing unit coupled with the amplitude control unit, the output unit and the input unit and processing the output signal and the input signal.

Preferably, the output unit and the input unit communicate with the remote terminal respectively through a first channel and a second channel, and a first channel attenuation of the first channel and a second channel attenuation of the second channel are substantially constant.

Preferably, the data transmitting and receiving device is a device using a PCI Express and the amplitude control unit determines the first amplitude of the data signal under a first operating state and determines the first amplitude of the test signal under a second operating state.

Preferably, the data transmitting and receiving device further includes a link training and status state machine (LTSSM) processing the test signal in the second operating state.

Preferably, the first operating state is that the output unit transmits the data signal, and the second operating state is one of two states being that the data transmitting and receiving device is under the condition that a system thereof is initializing and that the transmission of the data signal from the output unit is regarded as an unstable transmission.

The above aspects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically by the following embodiments. However, it is to be noted that the following descriptions of preferred embodiments of this invention are presented herein for the purposes of illustration and description only; it is not intended to be exhaustive or to be limited to the precise form disclosed.

Figure 1:
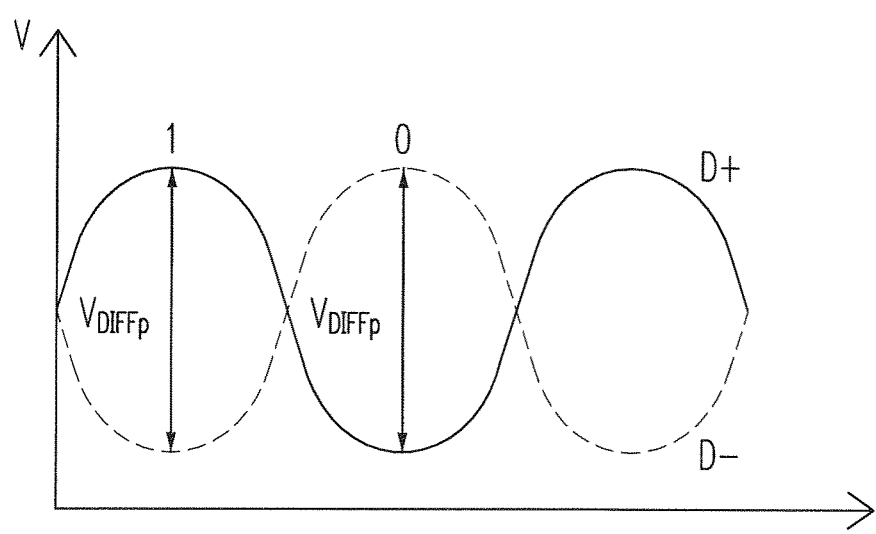
FIG. 1 is a diagram schematically illustrating the signal voltage of PCI Express device in the prior art.
Figure 2:
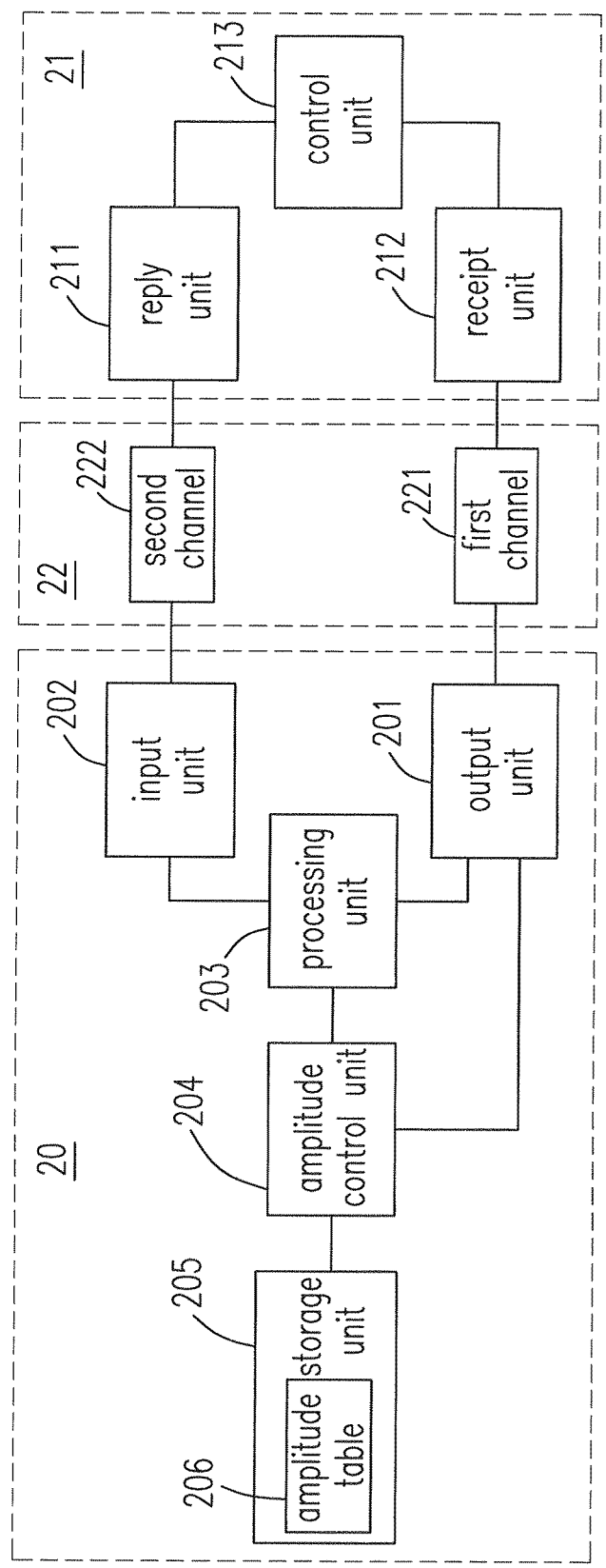
FIG. 2 is a diagram schematically illustrating a first embodiment according to the present invention.

FIG. 2 schematically illustrates a first embodiment according to the present invention. The first embodiment of the present invention includes a data transmitting and receiving device 20, a remote terminal 21 and a channel 22. The data transmitting and receiving device 20 further includes an output unit 201, an input unit 202, a processing unit 203, an amplitude control unit 204 and a storage unit 205. The output unit 201 and the input unit are coupled with the processing unit 203. The output unit 201 and the processing unit 203 and the storage unit 205 are coupled with the amplitude control unit 204. The output unit 201 is used for transmitting an output signal and the input unit 202 is used for receiving an input signal. The storage unit 205 includes an amplitude table 206 storing a plurality of preset amplitudes. The processing unit 203 is used for processing the output signal and the input signal. Furthermore, the remote terminal 21 further includes a reply unit 211 and a receipt unit 212 and a controlling unit 213. The reply unit 211 and the receipt unit 212 are coupled with the controlling unit 213. The channel 22 further includes a first channel 221 and a second channel 222. The plurality of the output signals transmitted by the output unit 201 are received through the first channel 221 by the receipt unit 212. The plurality of the input signals received by the input unit 202 are transmitted through the second channel 222 by the reply unit 211. Since the first channel 221 and the second channel 222 in the present invention can be the transmission paths with fixed channels, the channel attenuations of the first channel 221 and the second channel 222 are not arbitrarily changed so that they are substantially constant. Therefore, a test signal of the output signals can be used for determining a preferable amplitude which is utilized as a basis for selecting the amplitude of the data signals of the output signals.

In the above embodiment, the input signal can include an acknowledgement signal. When the data transmitting and receiving device 20 transmits a test signal, the amplitude control unit 204 is informed by the processing unit 203 to select a first amplitude from the plurality of preset amplitudes according to the amplitude table 206 of the storage unit 205 and then the output unit 201 transmits the test signal with the first amplitude to the receipt unit 212 of the remote terminal 21. It should be noted that the storage unit 205 is preferably a non-volatile memory and the amplitude table 206 is stored therein. If the test signal is received by the receipt unit 212, the acknowledgement signal is responded to the input unit 202 by the reply unit 211. After the acknowledgement signal is received by the input unit 202, it means that the first amplitude is high enough to make the test signal be received by the receipt unit 212. Therefore, the processing unit 203 is informed to report to the amplitude control unit 204 and the amplitude of the data signal can correspond to the first amplitude. The amplitude of the data signal can be equal to the first amplitude or higher than the first amplitude so that the data transmission can be ensured to be stable. The value of the first amplitude can be stored in the storage unit 205 or a preset amplitude corresponding to the first amplitude can be marked as a receivable amplitude in the amplitude table 206.

If the receipt unit 212 does not receive the first signal so that it can not respond the acknowledgement signal, the amplitude of the data signal can not be corresponding to the first amplitude. In addition, a preset amplitude corresponding to the first amplitude can be marked as a non-receivable amplitude in the amplitude table 206. The amplitude control unit 204 is informed by the processing unit 203 to select another preset amplitude higher than the first amplitude according to the amplitude table 206 to be a second amplitude for test. After a plurality of amplitude tests, a receivable amplitude of the receipt unit 212 can be obtained to be a basis for selecting the amplitude of the data signal. Preferably, the first amplitude is set as the minimum amplitude of the plurality of the preset amplitudes and is increased gradually until the test signal has been received by the receipt unit 212.

In different embodiment, a set of at least one receivable amplitude can be obtained to store in the storage unit 205 or the plurality of the preset amplitudes are respectively marked as the receivable amplitudes and the non-receivable amplitudes after the tests of the plurality of test amplitudes. Then, the minimum amplitude of the receivable amplitudes is selected from the at least one receivable amplitude to be a minimum amplitude by the amplitude control unit 204 and the amplitude of the data signal is decided to be the same as the minimum amplitude. The data signal is transmitted with the data signal amplitude to the receipt unit 212 by the output unit 201 so that the data transmitting and receiving device 20 uses the minimum receivable amplitude of the remote terminal 21 to transmit for achieving the power saving. In another embodiment, the amplitude of the data signal is preferably selected to be slightly higher than the minimum amplitude from the amplitude table 206 to make sure that the situation, the data signal can not be received, happened less on the remote terminal in order that the transmission process of the data signals can keep stable. In another embodiment, the amplitude of the data signals is preferably arbitrarily selected to be slightly higher than the minimum amplitude without reference of the amplitude table 206 for maintaining the stabilization of the data signal transmission.

In different embodiment, the storage unit 205 can only store the amplitude table 206 having the plurality of preset amplitudes. The data transmitting and receiving device 20 can further includes an amplitude register unit (not shown in figure). The amplitude register unit can be coupled with the amplitude control unit 204 and configured to store the receivable amplitude, the minimum amplitude, the data amplitude or a combination thereof to provide reference for the amplitude control unit 204.

In different embodiment, the first amplitude is an arbitrary one of the preset amplitudes and the first amplitude, such as the maximum amplitude of the preset amplitudes, might be received directly by the remote terminal 21. Therefore, when the first amplitude is not the minimum amplitude of the preset amplitudes for test, the processing unit 203 can informed the amplitude control unit 204 to select a third amplitude smaller than the first amplitude from the plurality of preset amplitudes and the output unit transmits the test signal with the third amplitude if the data transmitting and receiving device 20 receives the acknowledgement signal.

Figure 3:
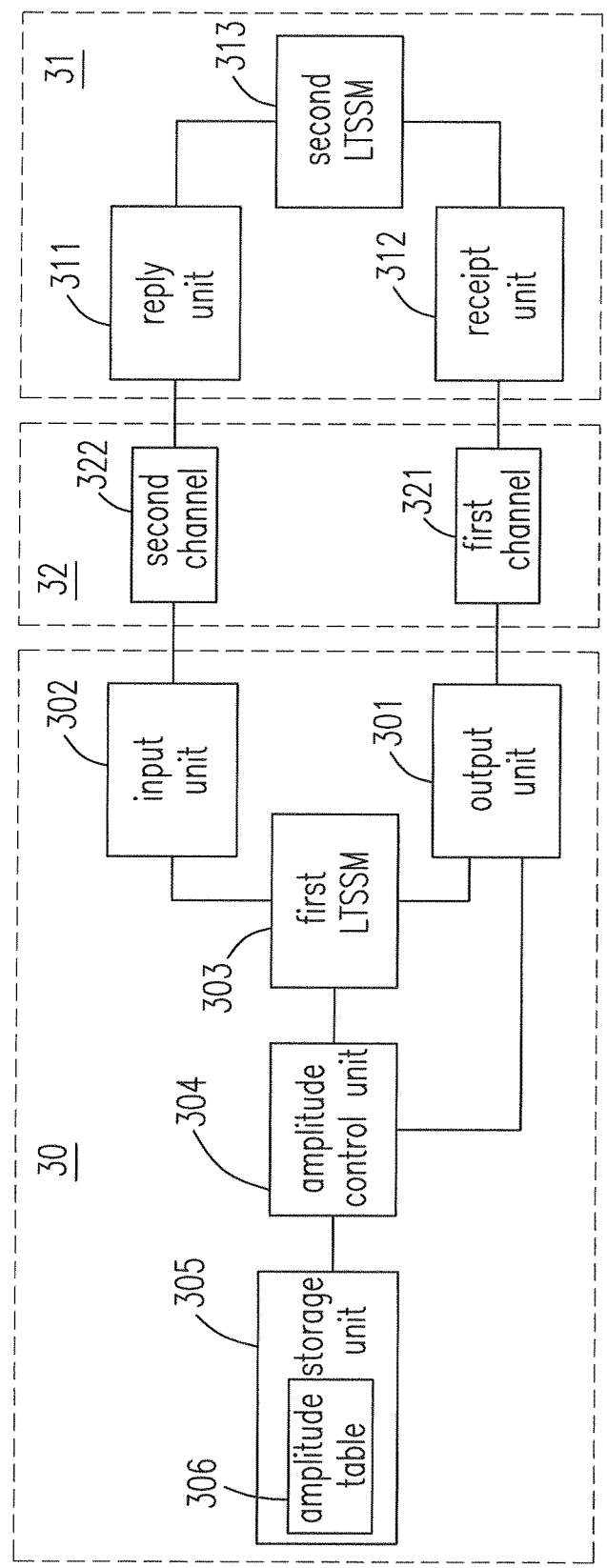
FIG. 3 is a diagram schematically illustrating a second embodiment according to the present invention.

FIG. 3 schematically illustrates a second embodiment according to the present invention. The second embodiment of the present invention is the device of the first embodiment using a PCI Express. In other word, the data transmitting and receiving device 30 and the remote terminal 31 use the PCI Express. The data transmitting and receiving device 30 includes an output unit 301, an input unit 302, a first Link Training and Status State Machine (LTSSM) 303, an amplitude control unit 304 and a storage unit 305. The remote terminal 31 further includes a reply unit 311 and a receipt unit 312 and a second LTSSM 313. The channel 32 further includes a first channel 321 and a second channel 322. The difference between the first embodiment and the second embodiment is that the processing unit 203 and the controlling unit 213 in the first embodiment are respectively substituted with the first LTSSM 303 and the second LTSSM 313.

In the above embodiment, the first amplitude of the data signals is decided under a first operating state and the first amplitude of the test signals is decide under a second operating state by the amplitude control unit 304. In addition, the first operating state is that the output unit 301 is informed by the amplitude control unit 304 to transmit with the first amplitude when the output unit 301 transmits the data signal. The second operating state is that the data transmitting and receiving device 30 is under the condition that a system thereof is initializing or booting or that the transmission of the data signal from the output unit 301 is regarded as an unstable transmission. The transmission of the data signal is regarded as an unstable transmission for entering into the second operating state when the reply unit 311 of the remote terminal 31 consecutively transmits at least three Non-Acknowledgement (NAK) signals. Furthermore, the test signal and the acknowledgement signal is processed by the first LTSSM under the second operating state, wherein the test signal includes a first Training Sequence (TS1) and a second Training Sequence (TS2) and the acknowledgement signal includes TS2. In the above embodiment, the data transmitting and receiving device 30 and the remote terminal 31 using the PCI Express further include a data signal processing unit (not shown in figure) for processing the data signal.

In the above embodiment, when the amplitude control unit 304 is performed under the second operating state, the first LTSSM 303 informs the amplitude control unit 304 to select a first amplitude according to the plurality of preset amplitudes stored in the amplitude table 306 of the storage unit 305 and the amplitude control unit 304 informs the output unit 301 to transmit the test signal with the first amplitude to the receipt unit 312 of the remote terminal 31. It should be noted that the storage unit 305 is preferably a non-volatile memory and the amplitude table 306 is stored therein. If the test signal is received by the receipt unit 312, TS2 is responded to the input unit 302 by the reply unit 311. After TS2 is received by the input unit 302, the first LTSSM 303 is informed to report to the amplitude control unit 304 and the amplitude of the data signal can be corresponding to the first amplitude by the amplitude control unit 304. If the receipt unit 312 does not receive the first signal so that it can not respond TS2, the amplitude of the data signal can not be corresponding to the first amplitude. At that time, the amplitude control unit 304 is informed by the first LTSSM 303 to select another preset amplitude higher than the first amplitude to be a second amplitude for test. After a plurality of amplitude tests, a receivable amplitude of the receipt unit 312 can be obtained to be a basis for selecting the amplitude of the data signal. Preferably, the first amplitude is set as the minimum amplitude of the plurality of the preset amplitudes and is increased gradually until the test signal has been received by the receipt unit 312.

In different embodiment, a set of at least one receivable amplitude can be obtained to store in the storage unit 305 after the tests of the plurality of test amplitudes. Then, the minimum of the receivable amplitudes is selected from the at least one receivable amplitude to be a minimum amplitude by the amplitude control unit 304 and the amplitude of the data signal is decided to be the same as the minimum amplitude. The data signal is transmitted with the data signal amplitude to the receipt unit 312 by the output unit 301 so that the data transmitting and receiving device 30 uses the minimum receivable amplitude of the remote terminal 31 to transmit for achieving the power saving. In another embodiment, the amplitude of the data signal is preferably selected to be slightly higher than the minimum amplitude from the amplitude table 206 to make sure that the situation, the data signal can not be received, happened less on the remote terminal in order that the transmission process of the data signals can keep stable. In another embodiment, the amplitude of the data signals is preferably arbitrarily selected to be slightly higher than the minimum amplitude without reference of the amplitude table 306 for maintaining the stabilization of the data signal transmission.

In the above embodiment, the data amplitude and the test amplitude are controlled by a differential voltage to form a differential peak-to-peak voltage, wherein the differential peak-to-peak voltage is set within a range of 175 mV to 1200 mV to comply the requirements of the receivable differential peak-to-peak voltage in PCI Express device.

Figure 4:
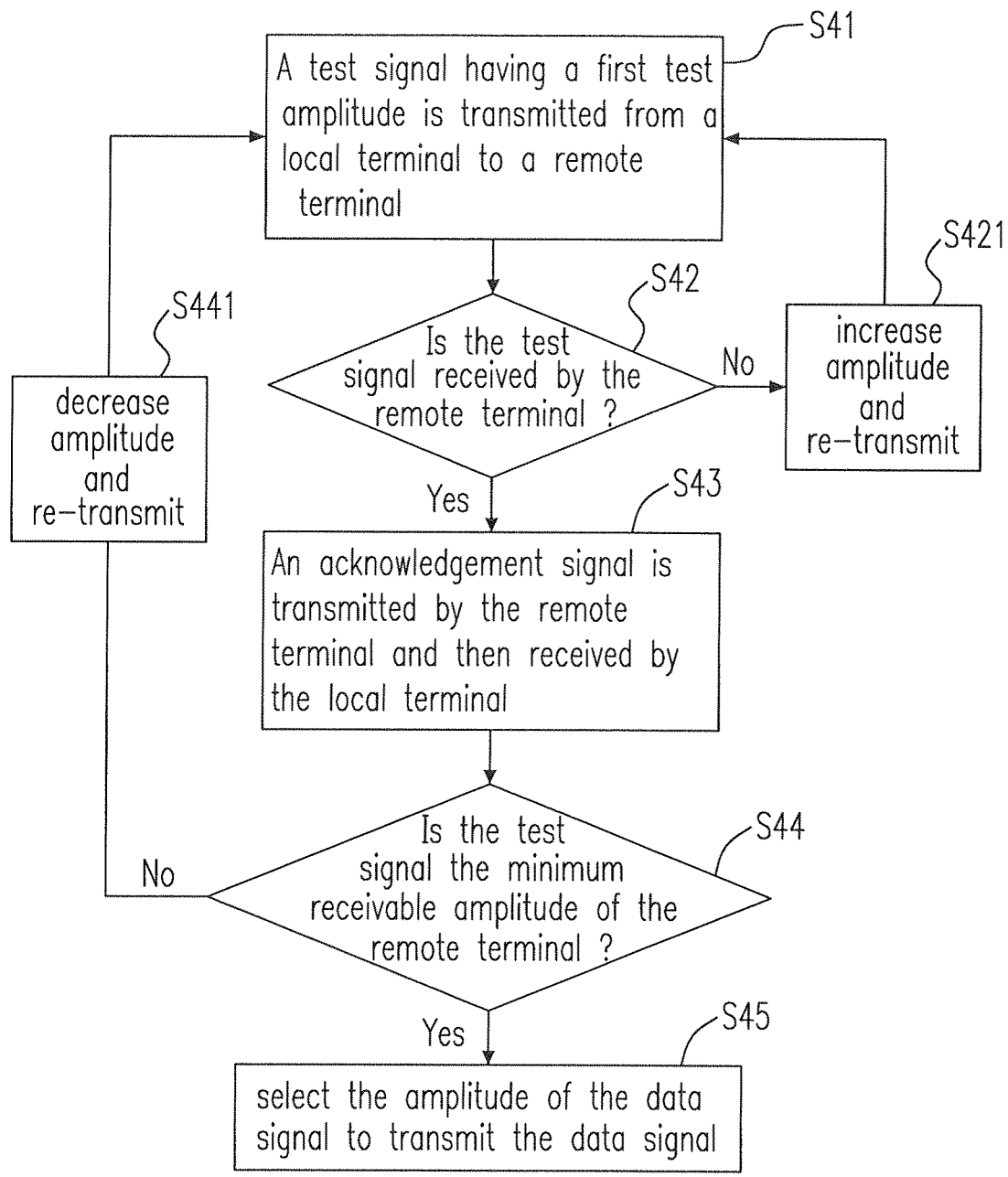
FIG. 4 is a diagram schematically illustrating a third embodiment according to the present invention.

FIG. 4 schematically illustrates a third embodiment according to the present invention. The third embodiment of the present invention is a power saving method for signal transmission. First, a test signal is transmitted with a first test amplitude by the data transmitting and receiving device 20, as the local terminal 20, to the remote terminal 21 (S41). If the test signal is received by the remote terminal 21 (S42), an acknowledgement signal from the remote terminal 21 is transmitted to the local terminal 20 for a response that the first test amplitude is high enough to make the test amplitude be received by the remote terminal 21 (S43). Then, the amplitude control unit 204 determines whether the first test amplitude is a minimum amplitude of the receivable amplitudes of the remote terminal 21 (S44). If true, the amplitude of the data signal is selected based on the minimum for transmitting the data signal (S45).

In the step S42, the acknowledgement signal can not be transmitted by the remote terminal 21 if the test signal is not received thereby. Therefore, the test signal would be transmitted again with a second test amplitude higher than the first test amplitude by the local terminal 20 if the plurality of acknowledgement signals should be responded by the remote terminal 21 is not received by the local terminal 20 in a predetermined period (S421).

In the step S44, before it is determined whether the amplitude is the minimum amplitude or not, the method for selecting the amplitude should be determined first. Therefore, the amplitudes which can not be received by the remote terminal 21 are defined as at least one non-receivable amplitude, and the amplitudes which can be received by the remote terminal 21 are defined as at least one receivable amplitude. If a small amplitude is used for test and then the amplitude is gradually increased until a receivable amplitude has been obtained to be received by the remote terminal 21, the amount of the at least one receivable amplitude is only 1 so that the receivable amplitude is the minimum amplitude. If a large amplitude is used for test and the amplitude is gradually decreased until a non-receivable amplitude has been obtained and the test signal with the non-receivable amplitude can not be received by the remote terminal 21, the amount of at least one non-receivable amplitude is only one so that the minimum amplitude of the at least one receivable amplitude is a receivable amplitude slightly higher than the non-receivable amplitude to form the minimum amplitude. If the method for selecting the amplitude is not the "large-to-small" selecting method or the "small-to-large" selecting method, the minimum amplitude of the at least one receivable amplitude, as the minimum amplitude, can be selected based on an amplitude sandwiched between the at least one receivable amplitude and the at least one non-receivable amplitude. Accordingly, the respective amounts of the receivable amplitude and the non-receivable amplitude can be more than one. If it is determined that the transmitted amplitude is not the minimum amplitude, the test signal will be transmitted again with a third test amplitude higher than the first test amplitude after the acknowledgement transmitted from the remote terminal 21 is received by the local terminal 20 (S441).

In the above embodiment, the first test amplitude, the second test amplitude, the third test amplitude and the data amplitude are selected form the plurality of preset amplitudes stored in an amplitude table 206 of a storage unit 205. Since the at least one receivable amplitude is formed according to the plurality of preset amplitudes and the minimum amplitude is selected according to the at least one receivable amplitude, the minimum amplitude is selected from the plurality of preset amplitudes.

Preferably, the minimum amplitude of the plurality of preset amplitudes is selected to be the first test amplitude for test and then the amplitude is gradually increased until the acknowledgement signal has been transmitted to the local terminal 20 by the remote terminal 21 in order that the connection therebetween should not be unstable during the process of deciding the data amplitude. The local terminal 20 acknowledges the receivable amplitude of the remote terminal 21 to obtain the basis for selecting the amplitude of the data signal. It is a preferable process that the amplitude is selected from a small amplitude to a large amplitude so that the connection state is only changed from disconnection to connection.

In the above embodiment, the amplitude of the data signal can be equal to the minimum amplitude. The data signal transmitted by the output signal 201 to the receipt unit 212 is transmitted with the minimum receivable amplitude of the remote terminal 21 for achieving the power saving. In another embodiment, the amplitude of the data signal can be selected to be slightly higher than the minimum amplitude from the plurality of the preset amplitudes to make sure that the transmission in the data transmitting process can be safer and more stable and the number of the error in the transmission process can be decreased. In another embodiment, the amplitude of the data signals can be arbitrarily selected to be slightly higher than the minimum amplitude without reference of the plurality of preset amplitudes.

Preferably, the method is used for wire transmission. There is a channel for transmitting the signal, and the signal would be attenuated when the signal is transmitted through the channel. However, the amplitude attenuation would not be changed too much so that it would be substantially a constant since the method is used for wire transmission such that the transmitting channel is fixed and is not changed arbitrarily. Therefore, the amplitude of the signal can be selected to be higher than or equal to the minimum amplitude for maintaining the stable power saving method.

Figure 5:
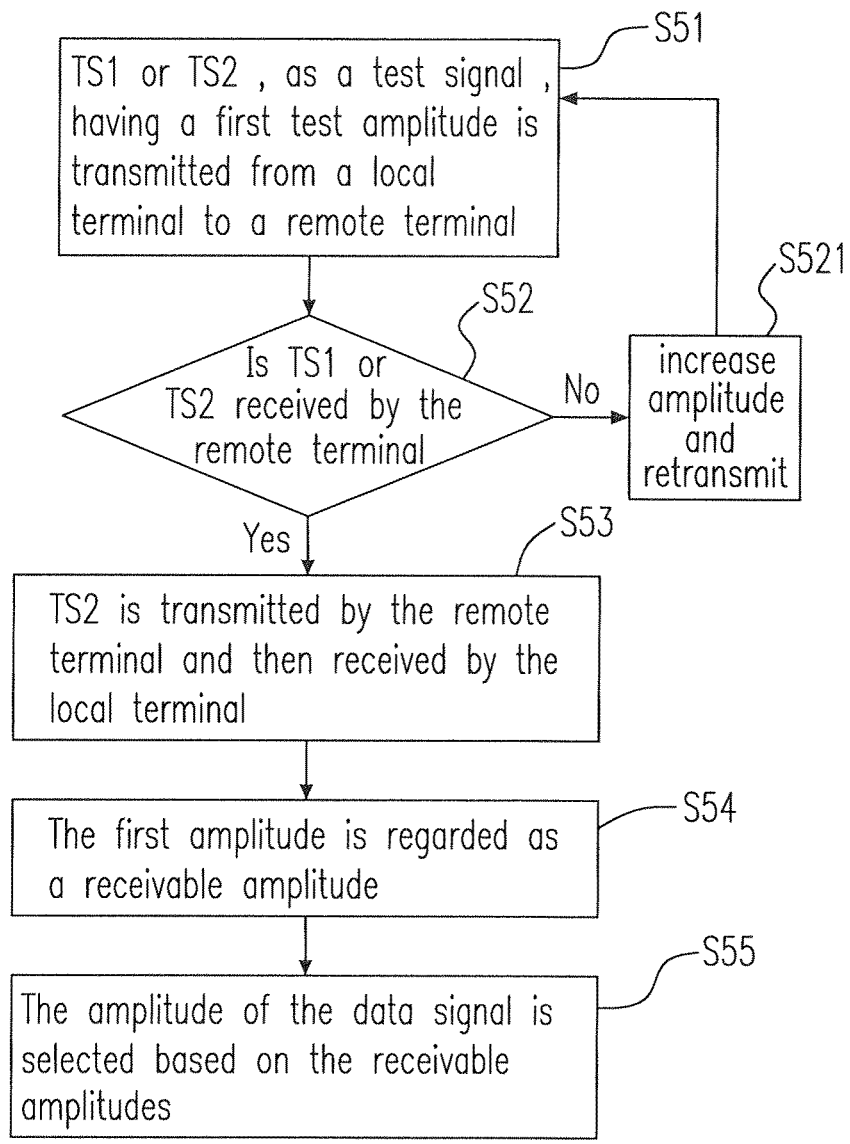
FIG. 5 is a diagram schematically illustrating a fourth embodiment according to the present invention.

FIG. 5 schematically illustrates a fourth embodiment according to the present invention. The fourth embodiment of the present invention is a power saving method for transmitting the signal between the remote terminal 31 and the data transmitting and receiving device 30 (the local terminal 30), both of which use a PCI Express. In PCI Express device, the local terminal 30 and the remote terminal 31 would transmit TS1 to each other during the link training and initialization process. When one of the local terminal 30 and the remote terminal 31 receives TS1 from the other one, one received TS1 would respond TS2 to the other one. In addition, when one of the local terminal 30 and the remote terminal 31 receives TS2 from the other one, one received TS2 would respond TS2 to the other one. The steps of the link training and initialization process are finished when both of the local terminal 30 and the remote terminal 31 are transmitting and receiving TS2 simultaneously.

First, TS1 or TS2, as a test signal, is transmitted with a first test amplitude by the local terminal 30, to the remote terminal 31 (S51). If TS1 or TS2 is received by the remote terminal 31 (S52), TS2 is transmitted to the local terminal 30 by the remote terminal 31 for a response that the first test amplitude is high enough to make the test amplitude be received by the remote terminal 31 (S53). Then, the first test amplitude is regarded as a receivable amplitude by the amplitude control unit 304 (S54). The amplitude of the data signal is selected based on the receivable amplitude for transmitting the data signal (S55). In the step S52, TS2 can not be transmitted by the remote terminal 31 if both of TS1 and TS2 are not received thereby. Therefore, TS1 or TS2 can be re-transmitted with a second test amplitude higher than the first test amplitude by the local terminal 30 when the local terminal 30 does not receive TS2 responded by the remote terminal 31.

It is described in the following description according that the power saving method of the present invention is only performed in the local terminal 30. First, TS1 would be transmitted with the first test amplitude to the remote terminal 31 by the local terminal 30. Since the power saving method of the present invention is not performed in the remote terminal 30, TS1 from the remote terminal 31 would transmitted with a large amplitude so that TS1 therefrom would be directly received by the local terminal 30. Since the local terminal 30 receives TS1 not TS2, the situation represents that TS1 from the local terminal 30 is not received by the remote terminal 31. Therefore, the test signal is changed to be TS2 for transmitting with the first test amplitude by the local terminal 30 (the same as step S51). If TS2 from the local terminal 30 is not received by the remote terminal 31, the remote terminal 31 will keep transmitting TS1 and the local terminal 30 will keep increasing the amplitude for transmitting TS2 (the same as step S521). When the remote terminal 31 receives TS2 and then responds TS2 to the local terminal 30 (the same as step S53), the power saving method is finished to select the amplitude of the data signal (the same as step S55).

It is described in the following description according that the power saving method of the present invention is performed in both of the local terminal 30 and the remote terminal 31 and the minimum of the plurality of preset amplitudes is selected to be the first test amplitude to start for transmitting thereby. First, TS1, as the test signal, is transmitted with the first amplitude by both of two terminals. Since the power saving method is performed in both of two terminals, the first test amplitude of the two terminals is not high enough to be received thereby. Therefore, the two terminals will keep increasing their amplitude. If the amplitude of the remote terminal 31 is the first to reach the receivable amplitude of the local terminal 30, the test signal of the local terminal 30 will be changed to be TS2 to transmit to the remote terminal 31 (the same as step S51). However, the amplitude of the local terminal 30 is not high enough to make TS2 be received by remote terminal 31 and the local terminal 30 receives TS1 not TS2. Therefore, the amplitudes of the local terminal 30 and the remote terminal 31 will keep increasing (the same as step S521). When the amplitude of TS2 of the local terminal 30 is high enough to be received by the remote terminal 31, the remote terminal 31 will stop increasing the amplitude and transmit TS2 to the local terminal 30 (the same as step S53). Since TS1 has been received by the local terminal 30 so that TS2 can be directly received thereby, the power saving method is finished to select the amplitude of the data signal (the same as step S55). In the above embodiment, if the amplitude of the local terminal 30 is the first to reach the receivable amplitude of the remote terminal 31, the process of the power method will not be influenced since it is just difference of the order of the receiving time. In the above embodiment, since the method is used for PCI Express, the first channel 321 and the second channel 322 of the local terminal 30 and the remote terminal 31 are arranged as parallel cables so that the difference between the amplitude attenuations of the two channels is very small. Therefore, the difference between the times when the two terminals respectively receive the test signal is very small so that the amplitude of the terminal who is the first to reach the receivable amplitude of the other will not increased too much.

Preferably, since the connection between the two terminals using PCI Express can not be disconnected. The above embodiment is only described according that the minimum of the plurality of the preset amplitudes is selected to be the first test amplitude in order that the connection between the two terminals should not be unstable during the process of deciding the data amplitude. Therefore, the process of the power saving method is only changed from the disconnection state to the connection state. However, if the frequent disconnection can be allowed in a device, the selection of the test amplitude would not be limited to be selected from a small amplitude to a large amplitude. Accordingly, the test amplitude can be selected from a large amplitude to a small amplitude or selected based on an amplitude sandwiched between the at least one receivable amplitude and the at least one non-receivable amplitude Preferably, the local terminal 30 acknowledges that the transmission of TS1 or TS2 is successful under the condition that the local terminal 30 consecutively receives at least eight consecutive of TS2 transmitted by the remote terminal 30 in order that the data signal can be transmitted stably enough with the amplitude thereof.

Preferably, the first test amplitude, the increased amplitude and the amplitude of the data signal is selected from the plurality of preset amplitudes stored in an amplitude table 306 of a storage unit 305.

In the above embodiment, the amplitude of the data signal can be equal to the receivable amplitude. The data signal transmitted by the output signal 301 to the receipt unit 312 is transmitted with the receivable amplitude of the remote terminal 31 for achieving the power saving. In another embodiment, the amplitude of the data signal can be selected to be slightly higher than the minimum amplitude from the plurality of the preset amplitudes to make sure that the transmission in the data transmitting process is more stable and the number of the error in the transmission process can be decreased. In another embodiment, the amplitude of the data signals can be arbitrarily selected to be slightly higher than the minimum amplitude without reference of the plurality of preset amplitudes.

In above embodiment, when the data signal is transmitted by the local terminal 30 during the data signal transmitting, an Acknowledgement (ACK) signal will be transmitted by the remote terminal 31 to the local terminal 30 if there is no error in the data signal received by the remote terminal 31. If there is at least one error in the data signal received by the remote terminal 31, the remote terminal will respond a Non-Acknowledge (NAK) signal to the local terminal 30.

Preferably, if at least three NAK signals are consecutively responded from the remote terminal 31, the data transmission is regarded to be under an unstable transmission state. Therefore, the amplitude of the data signal should be decided again to perform the power saving method for selecting a new amplitude of the data signal in other that the data signal can be transmitted stably.

In the above embodiment, the method is used for the data communication with handshaking step. Therefore, the local terminal 30 and the remote terminal 31 can obtain at least one receivable amplitude by handshaking.

In the above embodiment, PCI Express device transmits the signals with the wire. There is a channel for transmitting the signals, and the amplitude of the signals would be attenuated when the signal is transmitted through the channel. However, the amplitude attenuation would not be changed too much so that it would be substantially a constant since it is used for wire transmission such that the transmitting channel is fixed and is not changed arbitrarily. Therefore, the amplitude of the data signal can be selected to be higher than or equal to the minimum amplitude for maintaining the stable power saving method.

Preferably, the method is performed in all of the input/output devices using a PCI Express. It can be applied on mobile computing, computer desktop, notebook, work station, server, remote platform, etc.

While the invention has been described in terms of what are presently considered to be the most practical and preferred embodiments, it is to be understood that the invention should not be limited to the disclosed embodiment. On the contrary, it is intended to cover numerous modifications and variations included within the spirit and scope of the appended claims which are to be accorded with the broadest interpretation so as to encompass all such modifications and variations. Therefore, the above description and illustration should not be taken as limiting the scope of the present invention which is defined by the appended claims.

What is claimed is:

1. A power saving method controlled by a Link Training and Status State Machine (LTSSM) in a PCI Express device for data signal transmission during a link training and initialization process, comprising:
   providing a local terminal including a first training sequence (TS1) and a second training sequence (TS2);
   transmitting a test signal from the local terminal to initiate the link training and initialization process, wherein the test signal has a first test amplitude selected from a plurality of preset amplitudes;
   receiving an acknowledgement signal from a remote terminal when the test signal from the local terminal is received by the remote terminal;
   acknowledging by transmitting the TS2 of the local terminal from the local terminal if the acknowledgement signal transmitted from the remote terminal for a response to the test signal is received by the local terminal to finish the link training and initialization process; and
   transmitting a data signal having a data signal amplitude based on the first test amplitude by the local terminal after the link training and initialization process is finished,
   wherein:
   the test signal is one of the TS1 of the local terminal and the TS2 of the local terminal, and the acknowledgement signal includes a second training sequence (TS2) of the remote terminal; and
   the TS1 and TS2 of the local terminal and the TS2 of the remote terminal are transmitted in the PCI Express device;
   the local terminal transmits the test signal and receives the acknowledgement signal respectively through a first channel and a second channel, and the first channel and the second channel are arranged as parallel cables; and
   the method is repeated if at least three consecutive Non-Acknowledgement (NAK) signals are transmitted from the remote terminal and received by the local terminal while the local terminal is transmitting the data signal.

2. The method as claimed in claim 1, wherein the first test amplitude is a minimum of the plurality of preset amplitudes.

3. The method as claimed in claim 1 further comprising:
   transmitting the test signal with a second test amplitude higher than the first test amplitude if the acknowledgement signal transmitted from the remote terminal is not received in a predetermined period.

4. The method as claimed in claim 3, wherein the second test amplitude is selected from the plurality of preset amplitudes.

5. The method as claimed in claim 1 further comprising:
   transmitting the test signal with a third test amplitude smaller than the first test amplitude and selected from the plurality of preset amplitudes if the acknowledgement signal transmitted from the remote terminal is received by the local terminal.

6. The method as claimed in claim 1, wherein the method is used for wire transmission, a channel is configured between the local terminal and the remote terminal and an amplitude attenuation of the channel is substantially constant.

7. The method as claimed in claim 1, further comprising:
   receiving by the local terminal another test signal having another test amplitude from the remote terminal when the link training and initialization process is initiated, wherein the another test signal is transmitted in the form of the TS1 of the remote terminal; and
   acknowledging by transmitting the TS2 signal of the local terminal from the local terminal if the another test signal is received by the local terminal.

8. A data transmitting and receiving device communicating with a remote device in a PCI Express system, comprising:
   a storage unit storing an amplitude table with a plurality of preset amplitudes;
   an amplitude control unit including a first training sequence (TS1) and a second training sequence (TS2) controlled by a Link Training and Status State Machine (LTSSM) as specified by the PCI Express system coupled with the storage unit and selecting a first amplitude from the plurality of preset amplitudes;
   an input unit; and
   an output unit coupled with the amplitude control unit and configured to perform functions including:
   transmitting a test signal based on the selection of the amplitude control unit;
   receiving at least eight consecutive acknowledgement signals by the input unit from a remote device in response to the test signal during a link training and initialization process;
   transmitting a data signal based on the first amplitude after the link training and initialization process is finished, wherein the test signal is in the form of one of the first training sequence (TS1) and the second training sequence (TS2); and
   determining that transmission of the data signal is unstable, when the input unit receives at least three consecutive Non-Acknowledgement (NAK) signals.

9. The data transmitting and receiving device as claimed in claim 8, wherein the input unit receives an input signal, and the device further comprises: an input unit receiving an input signal; and
   a processing unit coupled with the amplitude control unit, the output unit and the input unit, and processing the test signal, the data signal and the input signal.

10. The data transmitting and receiving device as claimed in claim 9, wherein the output signal comprises a data signal and a test signal and the input signal comprises the acknowledgement signal.

11. The data transmitting and receiving device as claimed in claim 10, wherein an amplitude of the data signal corresponds to the first amplitude if the input unit receives the acknowledgement signal transmitted from the remote terminal after the output unit transmits the test signal with the first amplitude to the remote terminal.

12. The data transmitting and receiving device as claimed in claim 11, wherein the amplitude control unit is informed by the processing unit to select a second amplitude higher than the first amplitude from the plurality of preset amplitudes and the output unit transmits the test signal with the second amplitude if the acknowledgement signal transmitted from the remote terminal is not received by the data transmitting and receiving device.

13. The data transmitting and receiving device as claimed in claim 12, wherein the processing unit informs the amplitude control unit to select a third amplitude smaller than the first amplitude from the plurality of preset amplitudes and the output unit transmits the test signal with the third amplitude if the data transmitting and receiving device receives the acknowledgement signal transmitted from the remote terminal.

14. The data transmitting and receiving device as claimed in claim 9, wherein the output unit and the input unit communicate with the remote terminal respectively through a first channel and a second channel, and a first channel attenuation of the first channel and a second channel attenuation of the second channel are substantially constant.

15. The data transmitting and receiving device as claimed in claim 10, wherein the amplitude control unit determines the first amplitude of the data signal under a first operating state and determines the first amplitude of the test signal under a second operating state.

16. The data transmitting and receiving device as claimed in claim 15, wherein the input unit receives an input signal including another second training sequence (TS2), the another second training sequence (TS2) is the acknowledgement signal, and the device further comprises:
    an input unit receiving an input signal including the second training sequence (TS2), wherein the second training sequence (TS2) is the acknowledgement signal, and the LTSSM processes the test signal in the second operating state.

17. The data transmitting and receiving device as claimed in claim 16, wherein the first operating state is that the output unit transmits the data signal, and the second operating state is one of two states being that the data transmitting and receiving device is under the condition that a system thereof is initializing and that the transmission of the data signal from the output unit is regarded as an unstable transmission.

18. A data transmitting and receiving device communicating with a remote device in a PCI Express system, comprising:
    an input unit;
    a storage unit storing an amplitude table with a plurality of preset amplitudes;
    an amplitude control unit including a first training sequence (TS1) and a second training sequence (TS2) controlled by a Link Training and Status State Machine (LTSSM) as specified by the PCI Express system coupled with the storage unit and selecting a first amplitude from the plurality of preset amplitudes; and
    an output unit coupled with the amplitude control unit and configured to perform functions including:
    transmitting a test signal based on the selection of the amplitude control unit;
    transmitting a data signal substantially based on the first amplitude, wherein the test signal is in form of one of the first training sequence (TS1) and the second training sequence (TS2); and
    determining that transmission of the data signal is unstable, when the input unit receives at least three consecutive Non-Acknowledgement (NAK) signals.

* * * * *